(12) United States Patent
Chen et al.

(10) Patent No.: US 8,672,150 B2
(45) Date of Patent: Mar. 18, 2014

(54) MODULAR SHELVING

(75) Inventors: Kung-Cheng Chen, Taichung (TW); Lung-Chuan Huang, Taichung (TW)

(73) Assignee: E-MAKE Co., Ltd., Taichung (TW)

(*) Notice: Subject to any disclaimer, the term of this patent is extended or adjusted under 35 U.S.C. 154(b) by 64 days.

(21) Appl. No.: 13/565,261

(22) Filed: Aug. 2, 2012

(65) Prior Publication Data

US 2014/0034593 A1 Feb. 6, 2014

(51) Int. Cl.
| | |
|---|---|
| *A47B 43/00* | (2006.01) |
| *A47B 47/00* | (2006.01) |
| *A47B 57/00* | (2006.01) |
| *A47B 57/50* | (2006.01) |
| *A47B 57/40* | (2006.01) |
| *A47B 57/48* | (2006.01) |
| *A47B 57/22* | (2006.01) |
| *A47B 47/02* | (2006.01) |
| *F16B 21/09* | (2006.01) |
| *F16B 21/02* | (2006.01) |
| *A47B 57/20* | (2006.01) |

(52) U.S. Cl.
CPC ............ *A47B 57/50* (2013.01); *A47B 57/402* (2013.01); *A47B 57/487* (2013.01); *A47B 57/22* (2013.01); *A47B 47/027* (2013.01); *F16B 21/09* (2013.01); *F16B 21/02* (2013.01); *A47B 47/00* (2013.01); *A47B 57/20* (2013.01)
USPC ...... 211/187; 211/192; 211/103; 248/221.12; 108/147.16

(58) Field of Classification Search
CPC ......... A47F 5/0018; A47F 5/10; A47F 5/101; A47F 5/08; A47B 45/00; A47B 57/402; A47B 57/40; A47B 47/027; A47B 47/021; A47B 57/50; A47B 57/487; A47B 57/265; A47B 57/545; A47B 2031/004; A47B 47/0025; A47B 47/0058; A47B 47/0083; A47B 57/06; A47B 57/08; A47B 57/10; A47B 57/20; A47B 57/22; A47B 57/26; A47B 57/30; A47B 57/32; A47B 57/34; A47B 57/44; A47B 57/48; A47B 57/485; A47B 96/1408; A47B 96/1416; A47B 96/06; A47B 57/42; A47B 47/03; A47B 47/05; A47B 47/00; F16B 21/09; B60R 2011/0071; E04G 5/04; H02B 1/301; E04B 1/2403; E04B 2001/2409; E04B 2001/2448; E04B 2001/2415
USPC ......... 211/134, 190, 191, 192, 103, 189, 186, 211/187, 207; 248/219.1, 221.12, 221.11, 248/220.22, 234, 232.14, 241, 243; 108/144.11, 147.11, 147.12, 147.15, 108/147.16, 147.17; 312/265.1; 403/263, 403/353

See application file for complete search history.

(56) References Cited

U.S. PATENT DOCUMENTS

| | | | | |
|---|---|---|---|---|
| 2,639,043 | A * | 5/1953 | Dunham | 108/64 |
| 2,733,037 | A * | 1/1956 | Dunham | 248/239 |
| 2,932,409 | A * | 4/1960 | Wineman, Jr. | 211/192 |

(Continued)

*Primary Examiner* — Jennifer E Novosad (57) ABSTRACT

An adjustable shelving assembly is provided with four corner members of L-shaped cross section, either half of each corner member including aperture members each including an upper, larger circle and a lower, smaller, vertical hole overlapping the larger circle thereof; at least one group of four interconnecting members each including upper and lower aperture elements and a through hole between the aperture elements, each aperture element including an upper, smaller, vertical hole and a lower, larger circle overlapping the vertical hole thereof; elongated retainers each including two enlargements at both ends respectively, an annular groove adjacent to one enlargement, and an annular shoulder between the groove and the other enlargement; lock pins each having a substantial portion fastened in the larger circle of the aperture member and the through hole; and at least one flat shelf each anchored on tops of the interconnecting members.

5 Claims, 11 Drawing Sheets

(56) References Cited

U.S. PATENT DOCUMENTS

| | | | | |
|---|---|---|---|---|
| 3,219,157 A * | 11/1965 | Bernhard | ............... | 403/108 |
| 3,266,635 A * | 8/1966 | McConnell | ............... | 211/191 |
| 3,346,126 A * | 10/1967 | Bloom et al. | ............... | 211/192 |
| 3,351,212 A * | 11/1967 | McConnell | ............... | 211/192 |
| 3,392,848 A * | 7/1968 | McConnell et al. | ............... | 211/192 |
| 3,700,020 A * | 10/1972 | Wallace | ............... | 411/512 |
| 3,702,137 A * | 11/1972 | Evans | ............... | 211/192 |
| 3,862,691 A * | 1/1975 | Mori et al. | ............... | 211/191 |
| 3,986,318 A * | 10/1976 | McConnell | ............... | 403/384 |
| 4,775,125 A * | 10/1988 | Pfeifer | ............... | 248/222.14 |
| 4,778,067 A * | 10/1988 | Bellerose | ............... | 211/187 |
| 4,955,743 A * | 9/1990 | King | ............... | 403/254 |
| 5,938,367 A * | 8/1999 | Olson | ............... | 403/254 |
| 6,155,441 A * | 12/2000 | Andersen et al. | ............... | 211/192 |
| 6,241,109 B1 * | 6/2001 | Kautz et al. | ............... | 211/192 |
| 6,595,379 B1 * | 7/2003 | Powell | ............... | 211/192 |
| 6,802,426 B2 * | 10/2004 | Weaver et al. | ............... | 211/192 |
| 6,854,611 B2 * | 2/2005 | Powell | ............... | 211/192 |
| 8,424,694 B2 * | 4/2013 | Eustace | ............... | 211/192 |
| 2001/0045404 A1 * | 11/2001 | Pellegrino | ............... | 211/192 |
| 2002/0027116 A1 * | 3/2002 | Herzog et al. | ............... | 211/192 |
| 2002/0153341 A1 * | 10/2002 | May et al. | ............... | 211/192 |
| 2004/0079719 A1 * | 4/2004 | Weaver et al. | ............... | 211/192 |
| 2004/0084394 A1 * | 5/2004 | Powell | ............... | 211/192 |
| 2004/0104184 A1 * | 6/2004 | Hartman et al. | ............... | 211/26 |
| 2005/0103734 A1 * | 5/2005 | Saltzberg et al. | ............... | 211/187 |
| 2007/0062898 A1 * | 3/2007 | Choi | ............... | 211/192 |

\* cited by examiner

MODULAR SHELVING

BACKGROUND OF THE INVENTION

1. Field of the Invention

The invention relates to modular shelving and more particularly to an adjustable shelving assembly with improved characteristics.

2. Description of Related Art

Adjustable shelving systems are well known. Such systems have many advantages including enabling a maximum use of storage space. Such shelving is also adapted to accommodate and support varying products sizes, thus enabling great flexibility as product designs and storage requirement changes.

Adjustable shelving is very popular because they provide a user with the flexibility to assemble or build shelving units to the desired configurations and needs. Particularly, the adjustable shelving units allow the user to adjust height or distance between the shelves to facilitate storage of items having different shapes and sizes.

A conventional modular shelving assembly comprises poles, two post units, and an interior with first and second protrusions. Each connector of the pole has two tracks. Each track has a leg and a foot. The first protrusion of the post unit is retained in the foot of one track of the corresponding connector. The second protrusion of the post unit is retained in the foot of the other track of the corresponding connector when the post units are connected to the corresponding connector.

However, the conventional modular shelving assemblies suffer from a number of disadvantages including difficult assembly, complicated components, and unreliable in use. Thus, the improvement still exists.

SUMMARY OF THE INVENTION

It is therefore one object of the invention to provide an adjustable shelving assembly comprising four corner members of L-shaped cross section, either half of each corner member comprising a plurality of spaced aperture members formed lengthwise, each aperture member including an upper, larger circle and a lower, smaller, vertical hole overlapping the larger circle thereof; at least one group of four interconnecting members, each interconnecting member comprising upper and lower apertures and a through hole between the upper and lower aperture elements, each aperture element comprising an upper, smaller, vertical hole and a lower, larger circle overlapping the vertical hole thereof; a plurality of elongated retainers each comprising two enlargements at both ends respectively, an annular groove adjacent to one enlargement, and an annular shoulder between the groove and the other enlargement wherein a diameter of either enlargement is smaller than that of the larger circle of the aperture member or that of the larger circle of the aperture element, and the diameter of either enlargement is larger than a diameter of the vertical hole of the aperture member or a diameter of the vertical hole of the aperture element; a plurality of lock pins each comprising a head and a shaft extending from the head wherein the head of the lock pin has a diameter about the same as that of the larger circle of the aperture member, and wherein the shaft of the lock pin has a diameter about equal to that of the through hole and a length greater than that of the through hole; and at least one flat shelf each being anchored on tops of the interconnecting members in a friction fit; wherein the groove of the retainer is clamped by the vertical hole of the aperture member, the interconnecting member is engaged with the corner member, the shoulder of the retainer is clamped by the vertical hole of the aperture element, the corner member and the interconnecting member are retained by the retainer, and a substantial portion of the lock pin is fastened in the larger circle of the aperture member and the through hole.

The above and other objects, features and advantages of the invention will become apparent from the following detailed description taken with the accompanying drawings.

DETAILED DESCRIPTION OF THE INVENTION

Referring to FIGS. 1 to 8, an adjustable shelving assembly in accordance with a first preferred embodiment of the invention comprises the following components as discussed in detail below.

Four corner members 10 and four interconnecting members 20 are provided. Each interconnecting member 20 fastens two adjacent corner members 10 together as detailed later.

Figure 1:
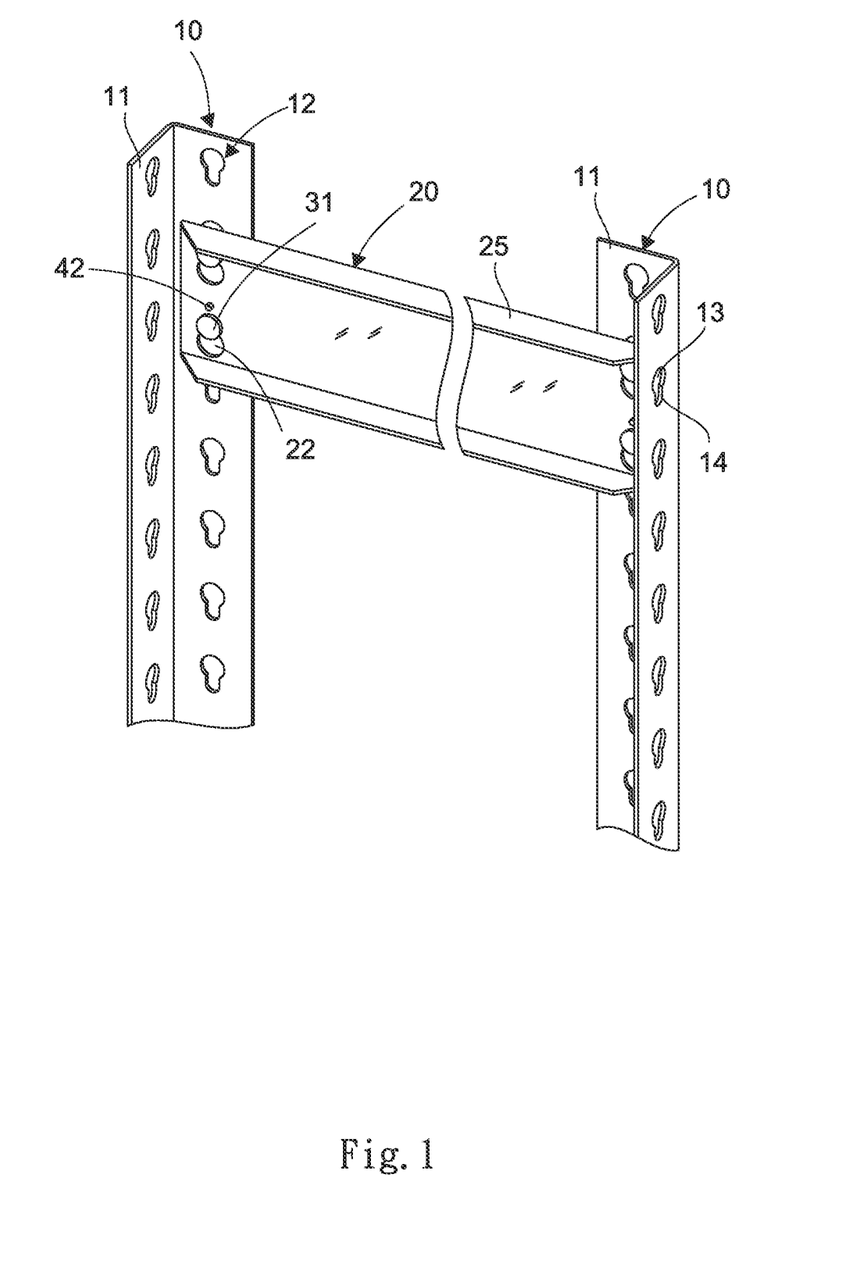
FIG. 1 is a perspective view of a portion of an adjustable shelving assembly according to a first preferred embodiment of the invention.
Figure 2:
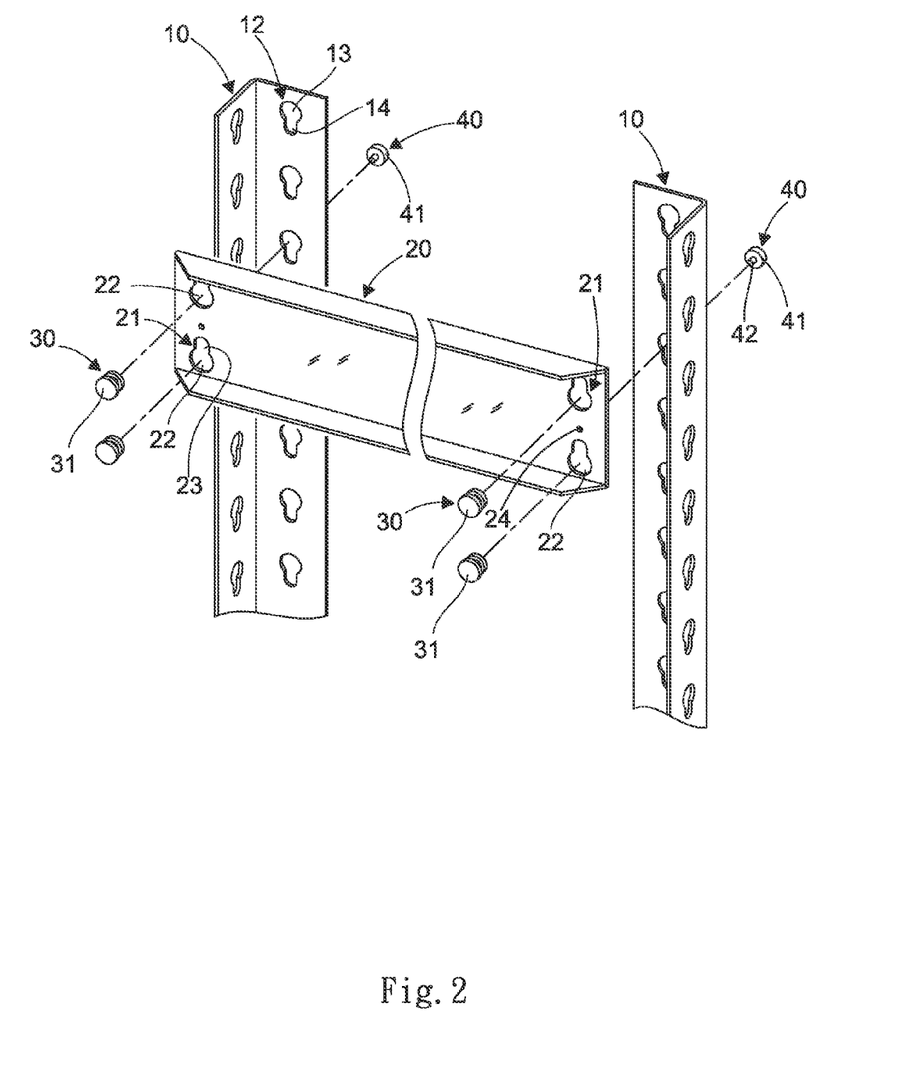
FIG. 2 is exploded view of FIG. 1 showing the detached interconnecting member.

The corner member 10 is of L-shaped cross section and comprises two joined side walls 11 each including a plurality of equally spaced apertures 12 formed lengthwise. As shown in FIG. 2, the aperture 12 is shaped as an inverted teardrop and comprises an upper, larger circle 13 and a lower, smaller, vertical hole 14 overlapping the larger circle 13. The interconnecting member 20 is a groove having two 90-degree bent sides 25. On either of the interconnecting member 20, there are provided upper and lower apertures 21 and a through hole 24 between the upper and lower apertures 21. As shown in FIG. 2, the aperture 21 is shaped as a teardrop and comprises an upper, smaller, vertical hole 23 and a lower, larger circle 22 overlapping the smaller, vertical hole 23. The aperture 21 is an inverted image of the aperture 12.

Figure 4:
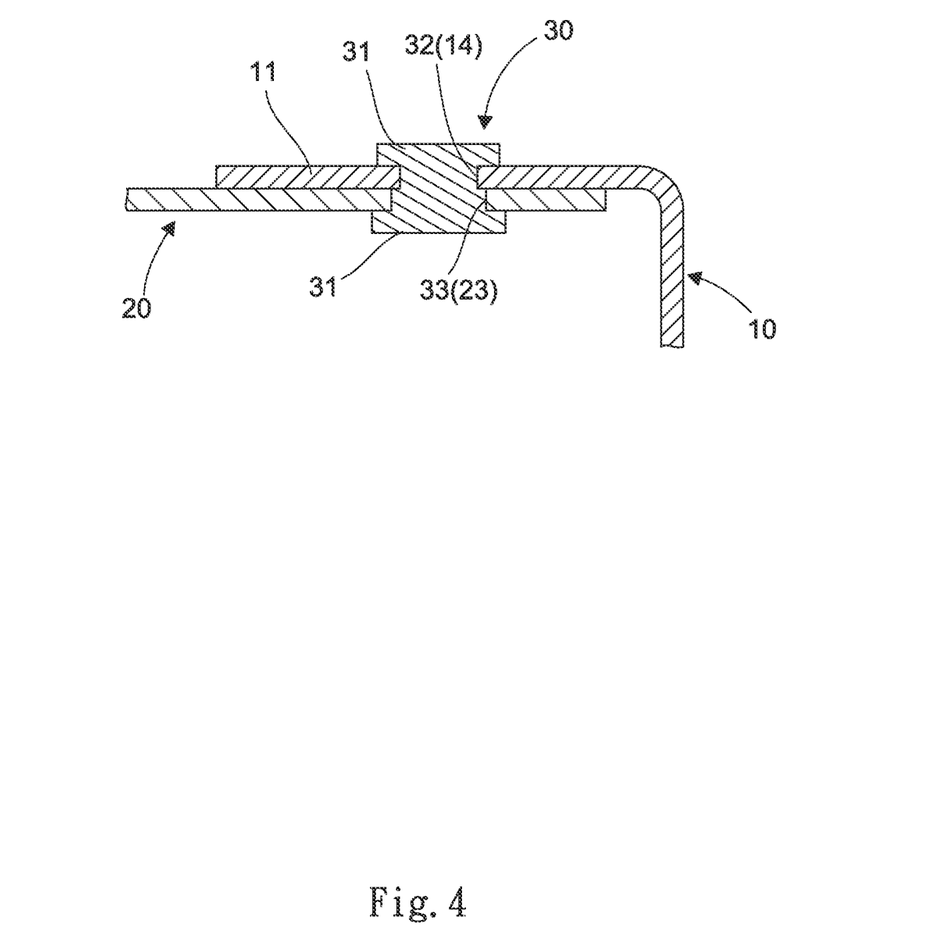
FIG. 4 is a cross-sectional view of one corner of the adjustable shelving assembly shown in FIG. 1.

As shown in FIG. 4, a retainer 30 is shaped as a barbell and comprises two enlargements 31 at both ends respectively, an annular groove 32 adjacent to one enlargement 31, and an annular shoulder 33 between the groove 32 and the other enlargement 31. Diameter of either enlargement 31 is smaller than that of the larger circle 22 or 13 but larger than a diameter of the vertical hole 23 or 14.

A lock pin 40 comprises a circular head 41 and a shaft 42 extending from a center of the head 41. The head 41 has a diameter about the same as that of the larger circle 13. The shaft 42 has a diameter about the same as that of the through hole 24 and a length greater than that of the through hole 24.

Figure 3:
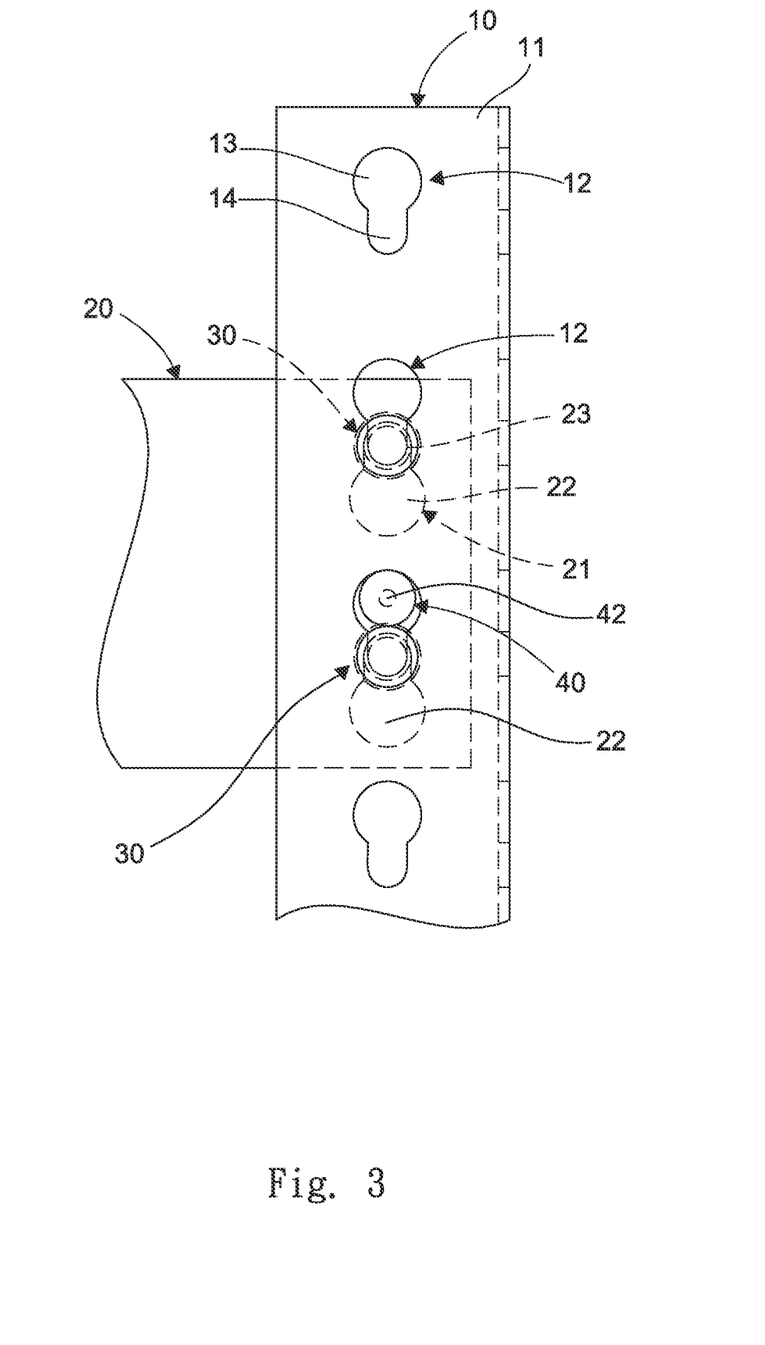
FIG. 3 is a plan view showing the interconnecting member and the corner member being fastened.
Figure 5:
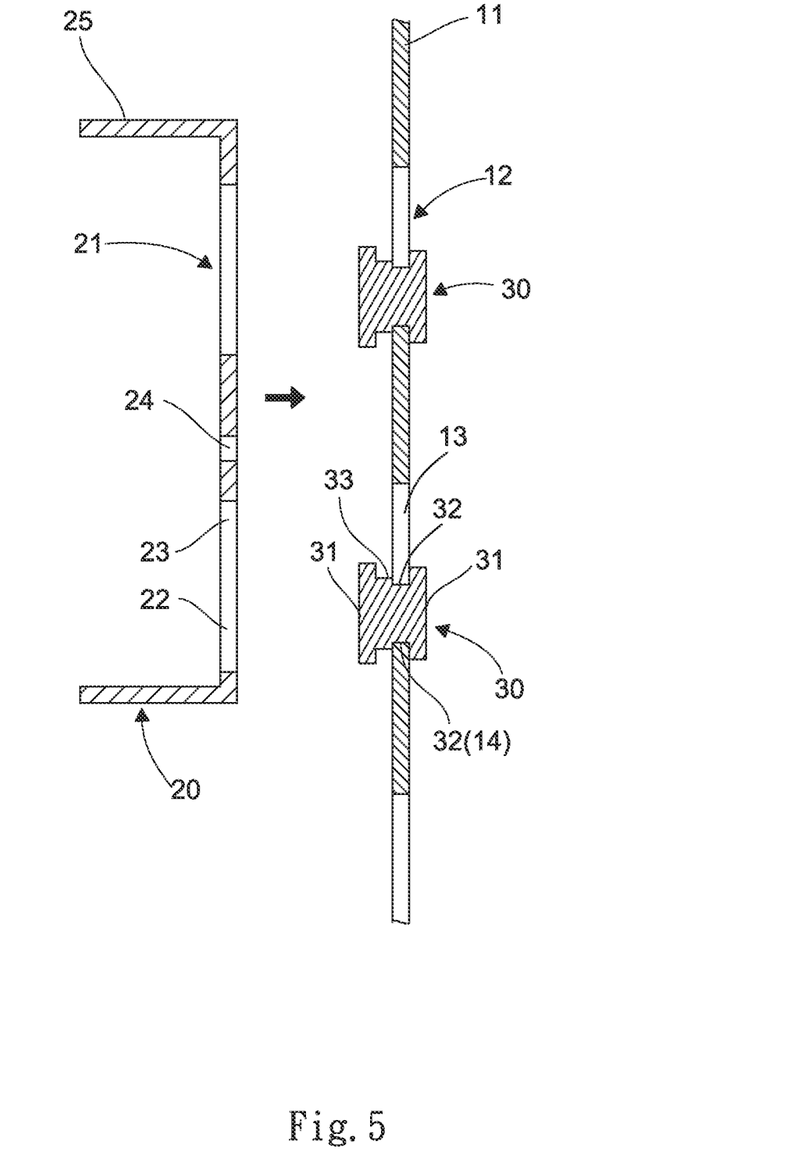
FIGS. 5, 6 and 7 are longitudinal sectional views showing the fastening steps of the interconnecting member and the corner member.
Figure 6:
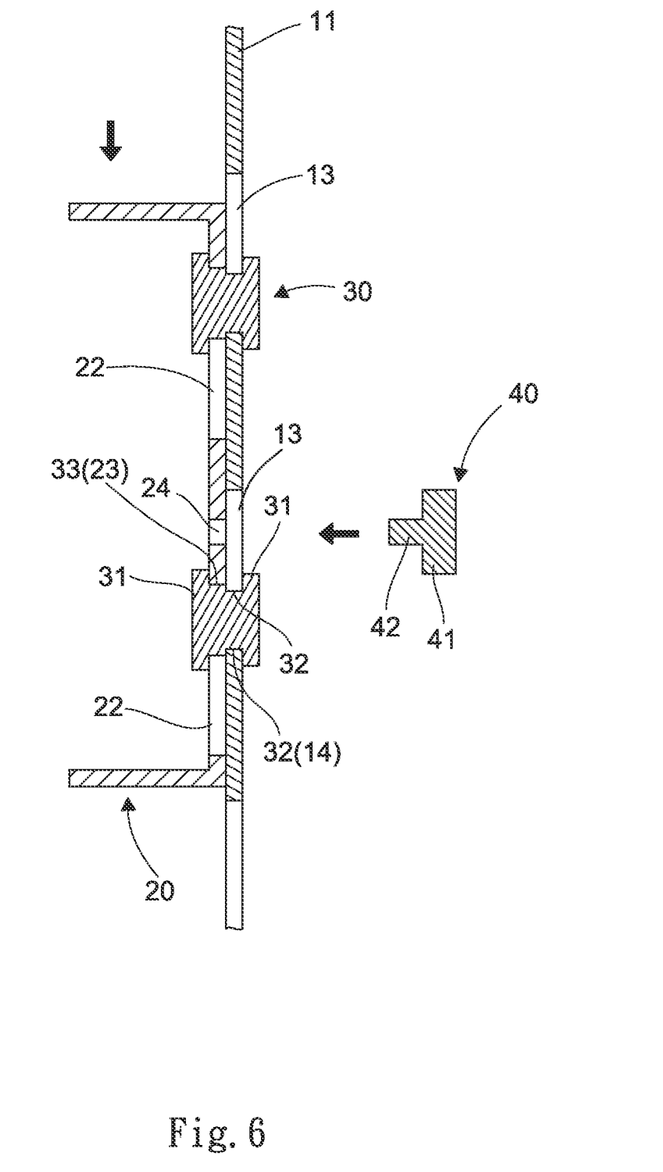
Figure 7:
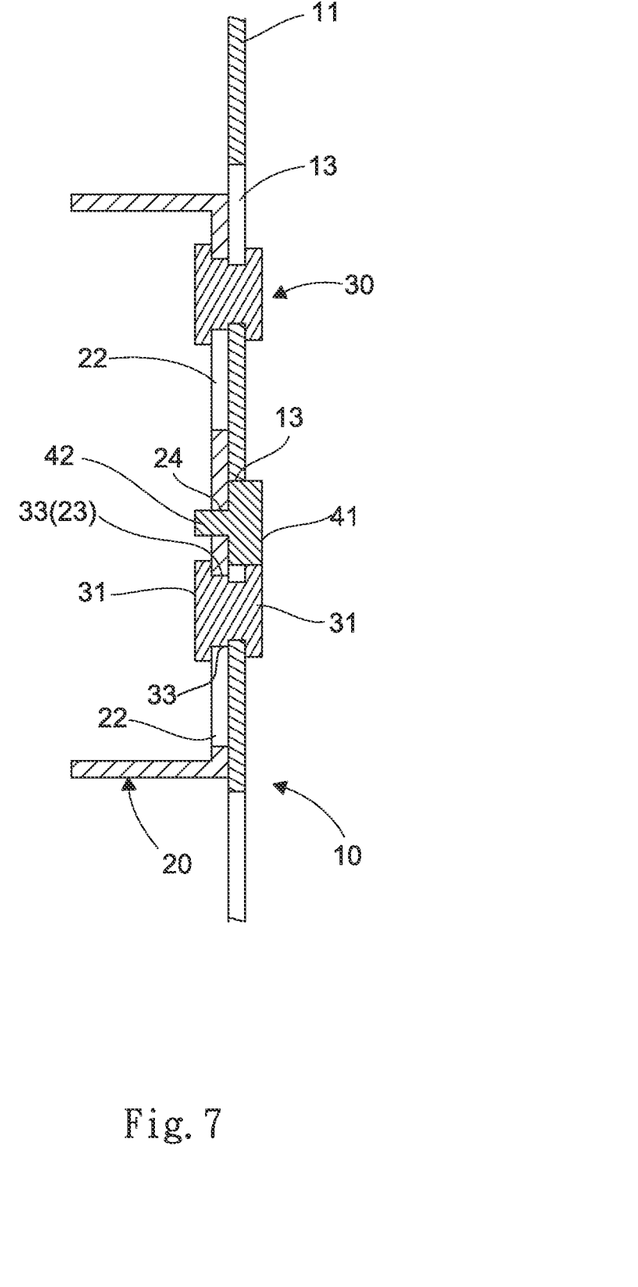
Figure 8:
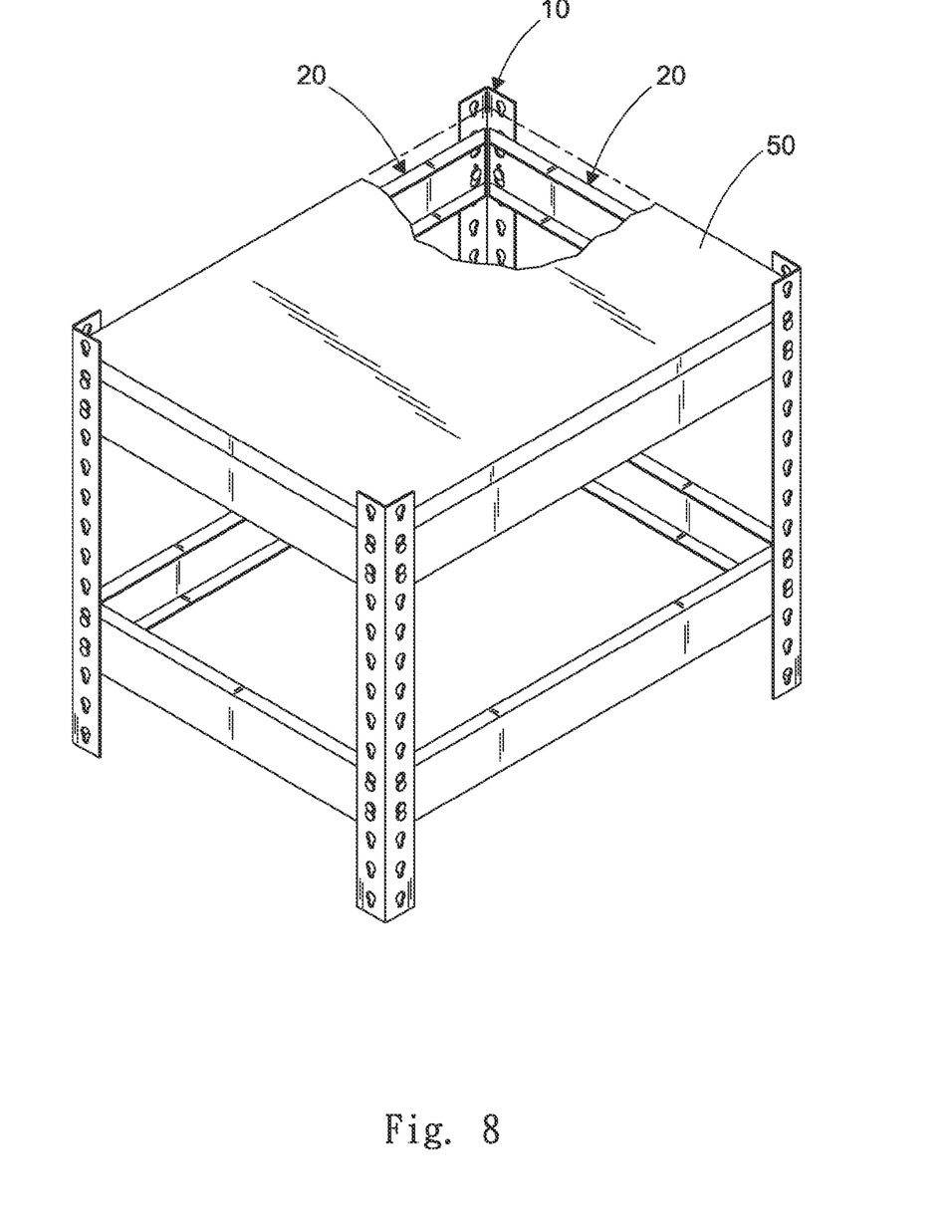
FIG. 8 is a perspective view of the complete adjustable shelving assembly.

In an assembly, the groove 32 of the retainer 30 is rested upon the vertical hole 14 after inserting one enlargement 31 of the retainer 30 through the larger circle 13, aligning the groove 32 with the vertical hole 14 thereunder, and lowering the groove 32 until being stopped (see FIGS. 3 and 5). Next, the interconnecting member 20 is moved to allow one enlargement 31 to pass the larger circle 22, engage the interconnecting member 20 with the corner member 10, and lower the interconnecting member 20 until the vertical hole 23 is rested upon the shoulder 33 (see FIGS. 5 and 6). Also, the shoulder 33 is clamped by the vertical hole 23, the groove 32 is clamped by the vertical hole 14, and the joined portion of the side wall 11 (i.e., the corner member 10) and the interconnecting member 20 are retained by the retainer 30 (see FIG. 4). Finally, insert the lock pin 40 into the larger circle 13 with the shaft 42 passing through the through hole 24 until being stopped (see FIGS. 6 and 7). The lock pin 40 is tightly disposed in both the larger circle 13 and the through hole 24 and exerts a fastening force on the other enlargement 31 in a friction fit. The interconnecting members 20 and the corner members 10 can be secured together by performing above assembly steps. Finally, a flat shelf 50 is placed on tops of the interconnecting members 20 in a rectangular area defined by the corner members 10 in a friction fit (see FIG. 8).

It is understood that performing a reversal of the assembly steps can detach the adjustable shelving assembly.

Figure 9:
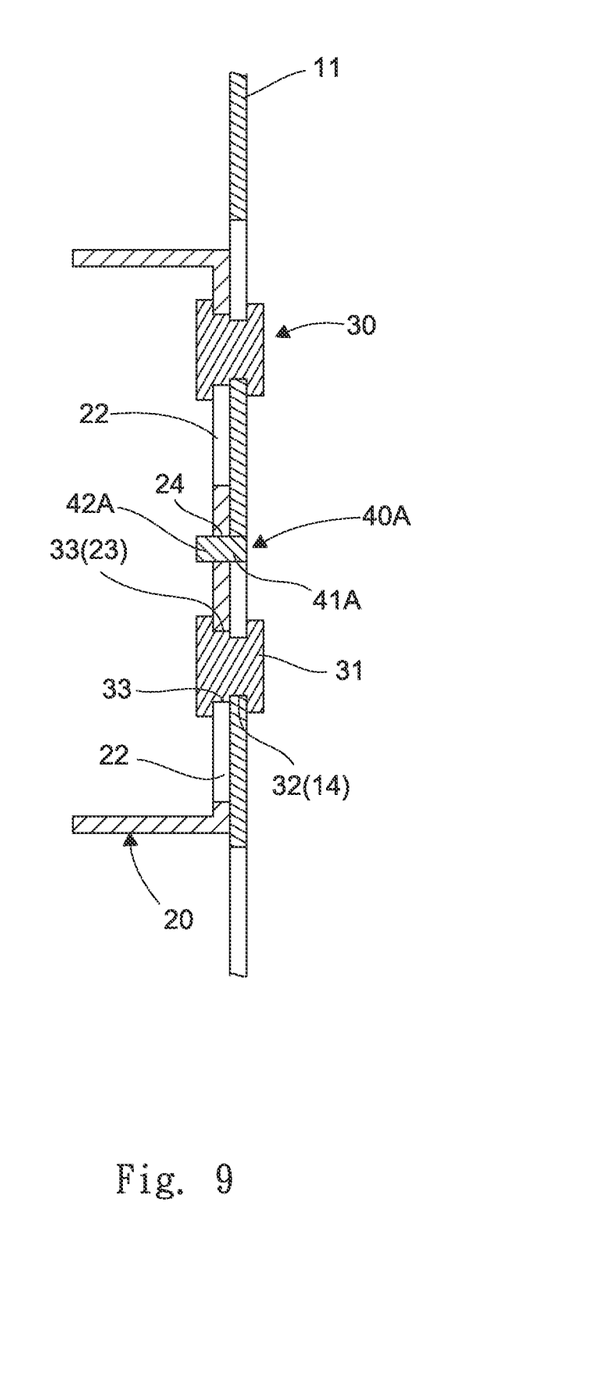
FIG. 9 is a longitudinal sectional view showing a second preferred embodiment of the invention, i.e., the lock pin of the second preferred embodiment.

Referring to FIG. 9, an adjustable shelving assembly in accordance with a second preferred embodiment of the invention is shown. The characteristics of the second preferred embodiment are substantially the same as that of the first preferred embodiment except the following: The lock pin 40A is implemented as an expansion nail having a solid head 41A and a shaft 42A.

Figure 10:
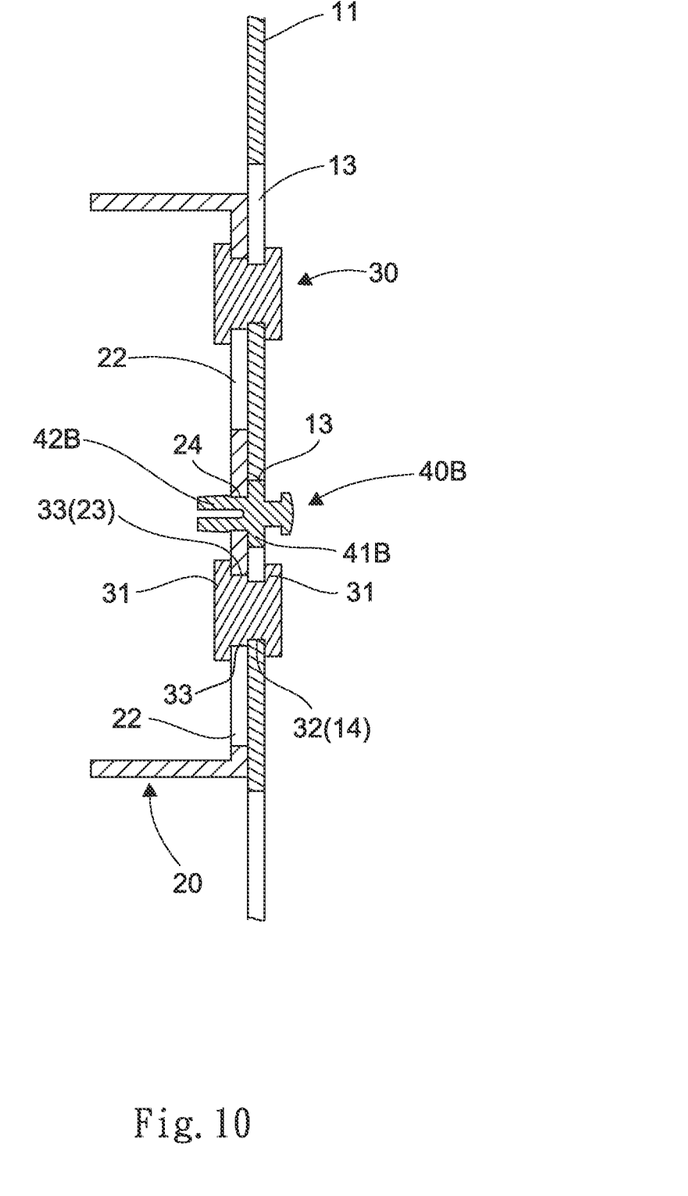
FIG. 10 is a longitudinal sectional view showing a third preferred embodiment of the invention, i.e., the lock pin of the third preferred embodiment.

Referring to FIG. 10, an adjustable shelving assembly in accordance with a third preferred embodiment of the invention is shown. The characteristics of the third preferred embodiment are substantially the same as that of the first preferred embodiment except the following: The lock pin 40B has an intermediate, annular flange 41B and two opposite, flexible latches 42B opposite to the enlarged head.

Figure 11:
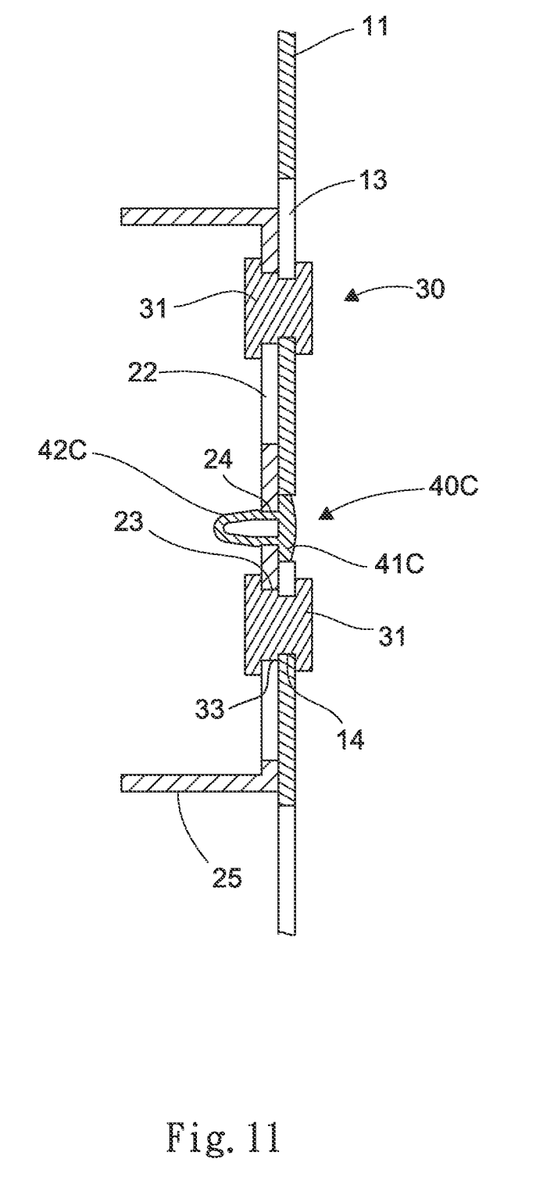
FIG. 11 is a longitudinal sectional view showing a fourth preferred embodiment of the invention, i.e., the lock pin of the fourth preferred embodiment.

Referring to FIG. 11, an adjustable shelving assembly in accordance with a fourth preferred embodiment of the invention is shown. The characteristics of the fourth preferred embodiment are substantially the same as that of the first preferred embodiment except the following: The lock pin 40C has a curved head 41C and a flexible hollow projection 42C.

While the invention has been described in terms of preferred embodiments, those skilled in the art will recognize that the invention can be practiced with modifications within the spirit and scope of the appended claims.

What is claimed is:

1. An adjustable shelving assembly comprising:
    four corner members of L-shaped cross section, each corner member comprising two halves, and either half of each corner member comprising a plurality of spaced aperture members formed lengthwise, each aperture member including an upper, larger circle and a lower, smaller, vertical hole overlapping the larger circle thereof;
    at least one group of four interconnecting members, each interconnecting member comprising upper and lower aperture elements and a through hole between the upper and lower aperture elements, each aperture element comprising an upper, smaller, vertical hole and a lower, larger circle overlapping the vertical hole thereof;
    a plurality of elongated retainers each comprising two enlargements at both ends respectively, an annular groove adjacent to one enlargement, and an annular shoulder between the groove and the other enlargement wherein the aperture element is upside down relative to the aperture member such that the aperture element and aperture member are inverted relative to each other, a diameter of either enlargement is smaller than either a diameter of the larger circle of the aperture member or a diameter of the larger circle of the aperture element, and the diameter of either enlargement is larger than either a diameter of the vertical hole of the aperture member or a diameter of the vertical hole of the aperture element; and
    a plurality of lock pins each comprising a head and a shaft extending from the head wherein the head of the lock pin has a diameter about the same as a diameter of the larger circle of the aperture member, and wherein the shaft of the lock pin has a diameter about equal to a diameter of the through hole and a length greater than a length of the through hole;
    wherein the groove of the retainer is clamped by the vertical hole of the aperture member, the interconnecting member is engaged with the corner member, the shoulder of the retainer is clamped by the vertical hole of the aperture element, the corner member and the interconnecting member are retained by the retainer, and a substantial portion of the lock pin is fastened in the larger circle of the aperture member and the through hole.

2. The adjustable shelving assembly of claim 1, further comprising at least one flat shelf each being anchored on tops of the interconnecting members in a friction fit.

3. The adjustable shelving assembly of claim 1, wherein the shaft of the lock pin is flexible.

4. The adjustable shelving assembly of claim 1, wherein the shaft of the lock pin is latched.

5. The adjustable shelving assembly of claim 1, wherein the shaft of the lock pin is a hollow projection.

* * * * *